Figure 1:
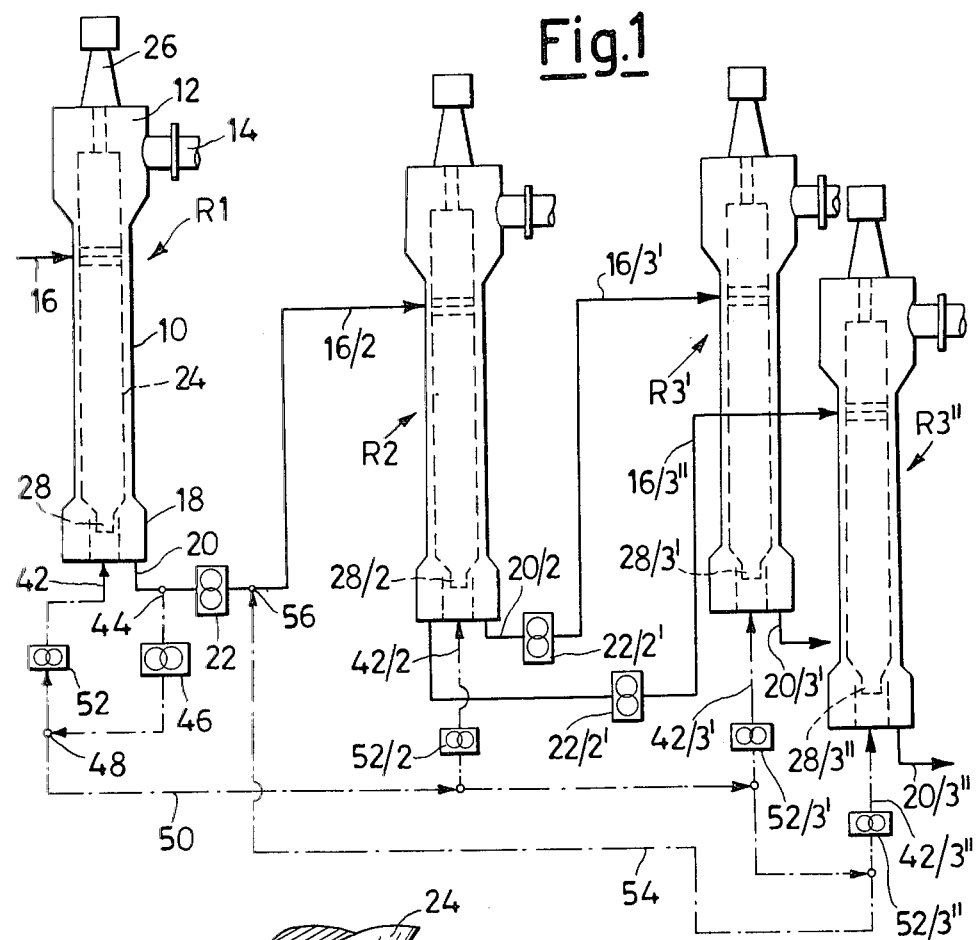

United States Patent [19]

Siclari et al.

[11] 3,946,835
[45] Mar. 30, 1976

[54] METHOD AND APPARATUS FOR LUBRICATING THE INTERNAL BEARINGS OF THIN-LAYER EVAPORATORS, USED IN POLYMERIZATION OR POLYCONDENSATION INSTALLATIONS

[75] Inventors: Francesco Siclari, Barlassina (Milan); Franco Magnoni, Milan, both of Italy

[73] Assignee: Snia Viscosa Societa' Nationale Industria Applicazioni Viscosa S.p.A., Milan, Italy

[22] Filed: Feb. 25, 1974

[21] Appl. No.: 445,098

[30] Foreign Application Priority Data
Feb. 26, 1973 Italy.................................. 20871/73

[52] U.S. Cl.............. 184/7 D; 184/27 C; 184/6.22; 184/1 E; 308/107; 122/32
[51] Int. Cl.²...................... F16N 7/14; F16N 13/00
[58] Field of Search............. 184/1 R, 7, 1 E, 27 C, 184/6.22, 6.21; 308/93, 107, 116, 168, 187, 170, 172; 122/488, 489, 32

[56] References Cited
UNITED STATES PATENTS

| | | | |
|---|---|---|---|
| 2,570,134 | 10/1951 | Lancaster et al.................. | 308/107 |
| 3,463,267 | 9/1969 | Dooley et al....................... | 184/1 E |
| 3,618,707 | 11/1971 | Sluhan................................ | 184/1 E |

*Primary Examiner*—Richard C. Pinkham
*Assistant Examiner*—William R. Browne
*Attorney, Agent, or Firm*—Shlesinger, Fitzsimmons & Shlesinger

[57] ABSTRACT

A method and a device are disclosed for lubricating the internal bearings of thin-layer evaporators used in polycondensation or polymerization installations, in which the lubricant used for said internal bearings is the same polymer in an appropriate intermediate degree of polymerization where it exhibits the fluidity required to serve as a lubricant. Means are provided for circulating and recycling the polymer and critical viscosity values are suggested for the polymer when used as a lubricant.

7 Claims, 2 Drawing Figures

U.S. Patent March 30, 1976 3,946,835

METHOD AND APPARATUS FOR LUBRICATING THE INTERNAL BEARINGS OF THIN-LAYER EVAPORATORS, USED IN POLYMERIZATION OR POLYCONDENSATION INSTALLATIONS

This invention relates to a method which can be used in the industry to ensure the efficient lubrication of the bearings arranged and operating in the interior of apparatus of the kind called "thin-layer evaporators," more particularly of the lower centering bearings of the respective rotors, when said apparatus are used for performance of stages, more particularly intermediate stages, of polymerization or polycondensation processes of macromolecular synthetic compounds. This invention will be described by way of example hereinafter in its application in the field of the production of polyesters, for example, but not compulsorily, for textile applications, it being however apparent that it is extended to the solution of equivalent technical problems, in the polymerization of other synthetic compounds, by the use of such thin layer evaporators.

These thin layer evaporators are well known in the field of the installations used in the chemical industry. They essentially comprise an elongate vertical cylindrical chamber, along whose inner walls there is caused to ooze, as a thin layer, the compound under progress of treatment of reaction. Within said body there is coaxially arranged a rotary assembly (which for simplicity will be called "the rotor" in the ensuing disclosure) which is properly borne by appropriate bearings and connected to adequate motive means.

The rotor sustaining and driving shaft is extended upwards and passes through the header of the treatment chamber, and is surrounded by appropriate glands and other sealing means, outside which and thus externally of the chamber, appropriate bearings are arranged, generally of the roller type, which are adapted to withstand both radial and axial loads, to ensure centering and, respectively, to sustain the weight of the rotary assembly. However, due to the considerable axial dimensions of the chamber and the rotor, and the narrow tolerances to be anode by as to coaxiality, it is essential that the mounting of the rotor be completed by at least a second lower bearing, even only for centering, and which is unavoidably present in the treatment chamber, if not in the lower portion thereof, where the compound falling as a thin layer is collected.

These thin-layer evaporators, properly arranged beforehand to operate at the required temperatures and extremely low absolute pressures, are used with advantage as autoclaves for the polymerization or polycondensation of synthetic compounds, more particularly for carrying out a few intermediate stages of such processes which are well known in the chemical industry. It is apparent and well known that such an industrial utilization subjects the internal bearings of these apparatus to extremely heavy ambient conditions. It should be borne in mind that, for example in the course of intermediate polyester polycondensation stages, the operations take place at temperatures of the range 265°C – 290°C and at absolute pressures lower than 20 millimeters of mercury.

On account of these conditions, the lower centering bearing is embodied as a simple bushing, generally of carbon, in which a short cylindrical shaft is rotated, which is integral with the bottom end of the rotor. It is imperative, however, in order to obtain a minimum service life and efficiency, that between the confronting surfaces of the relatively movable parts (bushing and shaft) a liquid film is inserted and maintained, having a viscosity sufficient to afford a certain lubricating action.

In the indicated field of industrial use, the lubrication of the internal bearings considered leads to the occurrence of technical problems which have been incompletely and unsatisfactorily solved heretofore. Obviously, the use of ordinary or special lubricants should be excluded, which would unavoidably pollute and contaminate the polymer. In the field of polyester production, more particularly polyethyleneterphthalates, the use has been suggested and adopted of ethylene glycol as the lubricant for the internal centering bearings, inasmuch as this glycol is one of the starting materials for polycondensation.

The efficiency of the glycol as a lubricant, is extremely low in the applications considered in this invention. As a matter of fact, it evaporates almost immediately under the temperature and absolute pressure conditions obtaining internally in the reaction chamber. It must be fed-in continually and in a large amount to the bearings in order to maintain a certain liquid layer between the relatively movable solid parts, thus also altering in a not negligible amount the reaction environment. It is essential to employ particular thin-layer evaporators, in which the lower bearing is positioned at a level above that of the liquid mass which is collected at the base of the reaction chamber since the feed of glycol to said mass would lead to product depolymerization phenomena. The latter requirement involves considerable structural complications, dismantling difficulties and others.

The lubrication with glycol, anyhow, is a low efficiency one. The bushings become very rapidly worn out and should be frequently replaced, bearing in mind, in addition, that their replacement should forerun, with a wide safety margin, the occurrence of conditions which may imply risks of breakage, the serious damage both to the apparatus and the product being self-explanatory. These replacements involve long stoppages of the production cycle and long and costly dismantling and reassembling operations.

An object of the invention is the solution of the technical problems inherent in overcoming the above enumerated difficulties while substantially removing the above listed defects and other limitations which occur when the current methods of lubrication of the inner bearings of thin-layer evaporators are adopted, as used in the above indicated field of polymerization and polycondensation of synthetic compounds having a high molecular weight.

According to the invention, it has been observed that these compounds exhibit, in at least one intermediate and transitional stage of the process of gradual increase of the degree of polymerization, and at the temperatures and absolute pressures of the local treatment, a physical state, more particularly as regards dynamic viscosity and kinematic viscosity, such as to permit their use as a lubricant with satisfactory results, in at least a part of the inner centering bearings of the thin-layer evaporator in which said intermediate polymer has been produced, and possibly in the evaporators in which a higher degree of polymerization is attained and where similar environmental conditions are maintained.

In the case of the production of polyesters, such a transitional physical state occurs when the polymer has attained an intrinsic viscosity in the order of 0.15–0.30 to which corresponds, under the usual reaction temperatures, a dynamic viscosity which is preferably in the range of 5 to 50 poises, the latter viscosity then becoming rapidly higher up to unacceptable values as the degree of polymerization is increased.

In the industrial continuous-polymerization installations, which include numerous reaction apparatus or chambers in cascade, thin-layer evaporators are notoriously used as the reaction vessels, in those phases or stages which individually lead to the production of a polymer having an intrinsic viscosity of from 0.15 to 0.20 (at the inlet to the extreme upstream evaporator) to about 0.35 – 0.45 (at the outlet of the extreme downstream evaporator). More particularly the polymer taken at the outlet of the upstream evaporator (and maintained to a temperature adapted to retain a sufficient fluidity) can be fed to the internal bearings of at least one part if not to all the evaporators of the set, and used in them as the lubricant, without obviously polluting the product being treated, or physically and/or chemically polluting the reaction environment.

The feeding-in of the polymer, as the lubricant, can be effected, moreover, in bearings immersed in the liquid mass at the base of the treatment chamber, since the lubricant emerging from the bearing and introduced in said mass is nothing else than the compound forming said mass, possibly to a lesser polymerization degree. This possibility is extremely advantageous since the immersion of the bearing improves its lubrication conditions and, above all, permits the bearing to be placed at the lowest possible level and to be structurally associated with the bottom of the apparatus, whose sidewalls thus become continuous and whose interior is not broken by radial arms or other structural components which are required for sustaining the bearing itself, in the case that the latter is positioned at a level higher than that of the liquid mass. This fact very considerably simplifies the construction of the apparatus as well as the possible operations of assembling and disassembling and the working efficiency of same.

Summing up, the method according to the invention can be expressed in the sense that (a) one identifies, in the overall plant in which the polymer compound is sequentially treated so as gradually to increase its polymerization degree, the point or points where the polymer transitionally exhibits the desired physical state at the temperature and at the absolute pressure of the treatment, (b) the quantity of polymer is drawn from said point or points, as it is necessary to the end of lubrication and (c) it is fed to the internal bearings of the thin-layer evaporators as employed for carrying out said polymerization stages.

Figure 2:
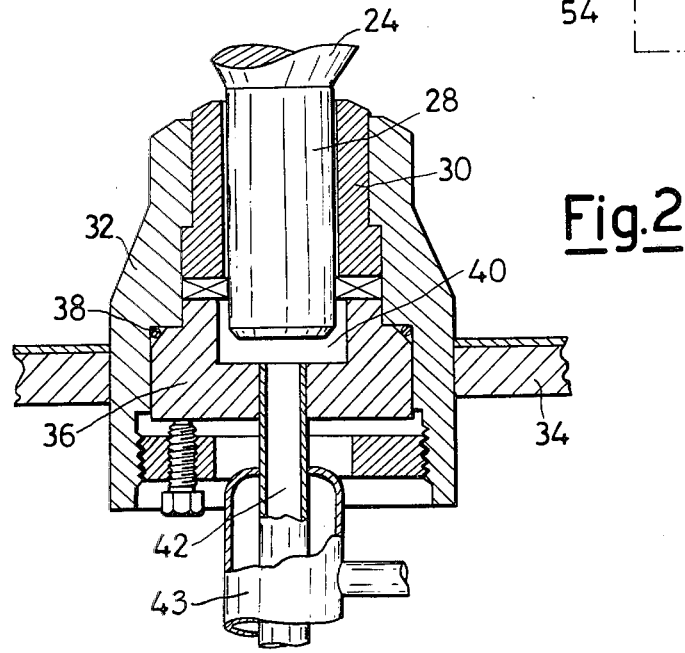

The foregoing and other features, advantages and industrial possibilities of the invention, along with an example of actual reduction to practice of the invention and the means necessary therefor, will become apparent in the course of the ensuing detailed description as referred to the accompanying drawings, wherein, in a merely diagrammatical form, with the omission of all the structural details and all means and devices known in the appertaining art and being not a part of the invention:

FIG. 1 diagrammatically shows the intermediate fraction of a complete installation for the polycondensation of polyethylene terephthalates, including a plurality of thin-layer evaporators, and FIG. 2 is a fragmentary view of the bottom wall of one of said evaporators, as structurally associated to the relevant rotor centering internal bearing.

In the example as diagrammatically shown in FIG. 1, the part of interest in the installation comprises four thin-layer evaporators, used as polycondensation reactors. For example, it comprises an upstream reactor R1, an intermediate reactor R2 and two downstream reactors R3' and R3" mutually in parallel. Obviously, the portion of the installation which is of interest could comprise a different number of thin-layer evaporators, with different arrangements in cascade and/or in parallel.

By observing for example the upstream reactor R1, these apparatus comprise (the following also applies to the other devices diagrammatically shown herein) an elongate vertical chamber 10 (equipped with a suitable jacket, not shown, for circulating a heating fluid, for example biphenyl) having a header 12 equipped with a vapor outlet 14, and having, near the top of its cylindrical portion 10, means for the entrance at 16 of the intermediate polymer as produced by the upstream apparatus (not shown), and which is further treated by causing it to fall as a thin layer along the inner walls of said part 10, to be then collected in the form of a liquid mass at the bottom 18 of the apparatus, wherefrom it is finally drawn at the outlet in 20 to be sent, by appropriate pumps 22 (and 22/2' and 22/2") to the respective downstream apparatus.

In the interior of the apparatus there is arranged the rotor 24 (diagrammatically shown) which is driven, at its top end, by a mechanism 26, which can comprise a motor or the driven member of a drive-transfer assembly.

In said mechanism 26 are also arranged the radial and axial centering top bearings and those for sustaining the rotor. The centering is completed by a lower bearing, preferably internally of the bottom 18, and which engages a short shaft 28 integral with the bottom end of the rotor 24, and whose lubrication originates the technical problems which are solved by the present invention.

FIG. 1 diagrammatically shows the path of the compound undergoing the treatment, which is sequentially fed to the inlets 16/2, 16/3' and 16/3" of the downstream apparatus.

During progress of its treatment in a portion of the installations as described above, the polymer, fed at 16 to the inlet of the upstream reactor R1, at an intrinsic viscosity of about 0.15 – 0.20, gradually has its degree of polymerization increased and attains as a rule the following intrinsic viscosity values: at the outlet 20 of R1 : 0.20 – 0.25; at the outlet 20/2 of R2 : 0.25 – 0.30; and at the outlets 20/3' and 20/3" of R3' and R3" : 0.30 – 0.45, to be then sent to the subsequent apparatus of the installation (not shown) in order to complete the process, said following apparatus not comprising thin-layer evaporators.

On considering that, at the outlet at 20 from the upstream apparatus R1, the polymer, at the temperature and the absolute pressure of the reaction, has a physical transitional state which is adapted to its use as the lubricant, of sufficient efficiency, and precisely a dynamic viscosity in the order of 15 – 50 poises, such a polymer can be used to lubricate all the internal bearings of said thin-layer evaporators. Obviously, to determine whether or not the polymer at the outlet 20 has the desired viscosity, the viscosity of the polymer at outlet 20 can be tested by any standard viscosity measuring apparatus.

These internal bearings can be embodied, for example, as shown in FIG. 2. In these bearings, the short bottom shaft 28 of the rotor 24 is housed under conditions of idle rotation in a bushing 30, preferably of carbon, mounted in a structural body 32 which is made integral with the bottom wall 34 of the apparatus, and in which means are prearranged for discharging the polymer. The bushing is fastened in place by means of an adjustable bottom piece 36, in registry with a deformable ring 38 or other sealing means. Inasmuch as the rotor 24 is borne by axial bearings arranged in the mechanism 26 at the top of the apparatus, such a shaft 28 does not rest against the bottom piece. Thus a chamber 40 is left in which the lubricant is introduced, for example through a piping 42.

On account of the fact that, according to the invention, there is used as the lubricant the polymer under its thermal conditions of treatment, such a piping 42 is surrounded, at least to the majority of its extension, by a jacket 43 through which biphenyl is caused conventionally to flow, or another suitable heating fluid, at the desired temperature.

Also, as diagrammatically indicated in FIG. 1, for the reduction to practice of the method in question, the assembly of the thin-layer evaporators is obviously associated with an appropriate auxiliary installation for feeding the polymer, used as the lubricant, to the several bearings to be lubricated. This auxiliary installation may comprise for example a branching-off at 44 for drawing the polymer, in the desired physical state, at the outlet at 20 from the upstream apparatus R1. By means of a primary pump 46, the drawn polymer is introduced at 48 into a distributing circuit 50 from which, by means of as many metering pumps 52, 52/2, 52/3' and 52/3'' it is sent to the individual pipings 42 and 42/2, 42/3' and 42/3'', respectively, for feeding the lubricating polymer to the respective centering bearings of the bottom shafts 28 and 28/2, 28/3' and 28/3'', respectively, of the rotors of all the thin-layer evaporators which are a part of the installation. By means of a return circuit 54, the excess polymer as fed by the primary pump 46 is recycled, for example at 56, downstream of the pump 22, into the duct which connects the outlet 20 of R1 to the inlet 16/2 of R2, that is, at a point where said polymer has the same physical state as above. Obviously all the pipings which make up said auxiliary installation are maintained at the temperature which is required in order to ensure the fluidity of the polymer taken at 44, which polymer, at the degree of polymerization corresponding to an intrinsic viscosity of about 0.20 – 0.25, would solidify at lower temperatures, more particularly at the atmospherical temperature.

Obviously, two or more auxiliary installations, with polymer-drawing points in different positions, could be useful, if desired, to a selective lubrication of internal bearings of several evaporators.

What is claimed is:

1. The method of lubricating the internal rotor bearings of a series of thin-layer evaporators of the type that are connected in cascade to form part of a continuous polymerization or condensation installation in which the viscosity of the polymeric compound being treated increases until it reaches a viscosity range in which the physical state of the compound makes it suitable for use as a lubricant for said bearings, comprising the steps of testing samples of the compound in at least one of the evaporators of said series of evaporators to determine which evaporator has the compound of proper viscosity for use as a lubricant for the bearings of said series of evaporators, drawing off part of said polymeric compound from the selected evaporator, and transporting the drawn compound to said bearings of said evaporators while maintaining the drawn compound at a temperature sufficient to keep it suitable for use as a lubricant for said bearings.

2. A method according to claim 1, including determining the evaporator in said installation at which the compound being treated has, at the reaction temperature range of 265°C – 290°C, a dynamic viscosity (coefficient of ordinary viscosity) in the order of 5–50 poises, and withdrawing the compound from said last-named evaporator and transporting it to said bearings.

3. A method according to claim 1, including determining the evaporator in said installation where the compound being treated exhibits an intrinsic viscosity in the order of 0.15 – 0.30, and withdrawing said compound from the last-named point and transporting it to said bearings.

4. A method according to claim 1, wherein said bearings are mounted in the bottoms of said evaporators to be immersed in the polymeric compound which condenses in said evaporators and flows to the bottom thereof for discharge to the next-successive evaporator, and including transporting the compound, which is drawn from said selected evaporator in said installation, into said bearings at the bottom of said evaporators.

5. Apparatus for lubricating the internal rotor bearings of a series of thin-layer evaporators of the type of which each has an input conduit and an output conduit, and said evaporators being connected in series as part of a continuous polymerization or condensation installation in which the output conduit of each evaporator in the series is connected to the input conduit of the next-successive evaporator downstream in the series thereof, the improvement comprising means for withdrawing from the output conduit of one of said evaporators a portion of the polymeric compound which passes through said series of evaporators, a plurality of supply conduits connecting each of the bearings in said evaporators to said withdrawing means, and pump means connected to said supply conduits to pump to each of said bearings at least a portion of the compound withdrawn from the output conduit of said one evaporator, said withdrawing means comprising a fitting connected at one end to the output conduit of said one evaporator, and means connecting the opposite end of said fitting to one of said supply conduits which is operatively connected through the remaining supply conduits to said bearings, said pump means comprising a primary pump connected to said fitting for drawing part of said compound from the output conduit of said one evaporator and feeding same to said one supply conduit, a plurality of metering pumps connected, respectively, between said one supply conduit and each of said bearings to supply part of the withdrawn compound to each bearing, and recycling circuit means for returning excess compound to the input conduit of another one of said evaporators located downstream from the point where the compound enters said primary pump.

6. Apparatus as defined in claim 5, wherein said primary pump is connected to the output conduit of the first evaporator in said series thereof, and said recycling circuit means is connected between the last evaporator in said series thereof, and the input conduit to the second evaporator in said series.

7. Apparatus as defined in claim 5 including a jacket surrounding a substantial portion of said one supply conduit and being spaced therefrom so that a heating fluid may be circulated between said jacket and said one supply conduit to maintain the compound in said one supply conduit at a desired temperature.

* * * * *